United States Patent [19]
Arthur et al.

[11] Patent Number: 4,463,766
[45] Date of Patent: Aug. 7, 1984

[54] CIGARETTE AND CIGARETTE FILTER MAKING MACHINE

[75] Inventors: High M. Arthur; Derek H. Dyett; Godfrey A. Wood, all of Bucks, England

[73] Assignee: Molins Limited, London, England

[21] Appl. No.: 198,069
[22] PCT Filed: Nov. 19, 1979
[86] PCT No.: PCT/GB79/00197
§ 371 Date: Jul. 17, 1980
§ 102(e) Date: Jul. 17, 1980
[87] PCT Pub. No.: WO80/01115
PCT Pub. Date: May 29, 1980

[30] Foreign Application Priority Data
Nov. 17, 1978 [GB] United Kingdom .............. 44926/78
Jan. 17, 1979 [GB] United Kingdom ................ 7901709

[51] Int. Cl.³ ............................................. A24C 5/14
[52] U.S. Cl. ................................... 131/84 R; 131/280
[58] Field of Search .................. 131/280, 281, 84 C, 131/84 R, 84 B, 84 A

[56] References Cited
U.S. PATENT DOCUMENTS
3,196,880 7/1965 Pinkham .......................... 131/84 R
4,063,563 12/1977 Lorenzen ......................... 131/84 R
4,190,061 2/1980 Heitmann et al. .................. 131/281

Primary Examiner—V. Millin
Attorney, Agent, or Firm—Antonelli, Terry & Wands

[57] ABSTRACT

A cigarette or filter making machine has a cut-off device (19) which is driven directly by its own motor (21), pick-up device (22) for monitoring the rotational speed and timing of the cut-off device, and at least one other independent motor (especially a motor 24 driving the garniture tape 15 and/or a motor driving the filter attachment machine) which is driven in synchronization with the cut-off device under the control of the monitoring pick-up device.

15 Claims, 3 Drawing Figures

CIGARETTE AND CIGARETTE FILTER MAKING MACHINE

Cigarette making machines commonly comprise means for forming a stream of tobacco or other smokable material which is enclosed in a continuous wrapper to form a continuous rod which is then cut at regular intervals. The rod-forming device commonly includes a garniture tape which supports the wrapper web while the cigarette filler stream is on the web and is being compressed and shaped to the final cross-section, and which assists in wrapping the web around the filler stream; the edges of the web are then normally brought together and secured by adhesive. The filler stream is commonly trimmed by means of a trimming device before being enclosed in the wrapper web. Examples of such machines are the Molins Mark 8 and Mark 9 cigarette making machines.

Cigarette filter making machines are commonly similar apart from the fact that the filter tow does not require trimming. An example of an existing filter making machine is the Molins PM5 machine.

In the Mark 8 generation of cigarette making machines, and also in the filter making machines of the same period, it was common to provide a main shaft which was driven at a speed equalling the number of rods per minute produced by the machine. For example, a machine making 2,000 cigarettes per minute would have a main shaft rotating at 2,000 revolutions per minute, the cutting device comprising commonly a rotary arrangement making one cut per revolution.

A more recent trend embodied, for example, in the Mark 9 and PM5 machines which are capable of running at speeds of 4,000 rods per minute or even higher, is to provide a main shaft running at well below the machine speed (i.e. in terms of rods per minute). The cut-off device is then driven from the main shaft through step-up gearing; and various other gears with appropriate ratios provide driving connections from the main shaft to the various other driven parts of the machine. By this means, the noise of the machine is reduced.

Noise has become an important criterion in the modern generation of machines, and machines have been built with cut-off devices having two blades so as to make two cuts per revolution and so as to rotate at half the previous speed. It is also possible to cut double-length rods which are cut later in the filter-attachment machine; assuming a double-knife cut-off device, this enables the cut-off device to rotate at one quarter the machine speed in terms of finished rods per minute. However, even with such an arrangement, at speeds in excess of 5,000 rods per minute, noise remains a problem; noise is generated by many parts of the machine, including the gearing.

According to one aspect of this invention in a method of making rods of the cigarette industry in which a continuous rod is formed and is cut at regular intervals, at least two different devices used in the manufacture of the rods are driven by separate motors, the speed of a first motor (the "master") being sensed, and the speed of a second motor (the "slave") being controlled so that the second motor runs at a speed having a predetermined relationship with the speed of the first motor.

Preferably the speed of the first motor is sensed by generating a pulsed electrical signal derived directly or indirectly from a rotary part on or associated with the first motor, and the speed of the second motor is sensed by generating a pulsed electrical signal derived directly or indirectly from a rotary part on or associated with the second motor.

In a cigarette making machine according to this invention the "master" motor preferably drives the cut-off device including, preferably, the moving parts (if any) of the ledger which supports the rod during cutting. Other parts of the machine are driven by one or more separate "slave" motors synchronised to the cut-off either as regards speed alone or as regards both speed and phase.

Various parts of the machine may be driven by separate motors synchronised to the cut-off. The accuracy with which synchronisation needs to be achieved varies. For example, the garniture tape drive needs to be accurately controlled so that the rod speed is closely related to the cut-off speed to produce rods of precisely the required length, but phase synchronisation is not normally needed. A printing device may be included to apply an insignia or legend to the wrapper web at regular intervals; the insignia or legend needs to be positioned with some degree of accuracy close to the end of each finished rod, so that accurate synchronisation of the speed of the printed drive is needed as well as fairly accurate phase synchronisation. The trimming device is another part of the machine which may also have its own independent drive motor, especially if it is arranged to produce "dense ends" in the stream at regular intervals, i.e. denser portions to form the ends of the finished cigarettes.

According to a second aspect of this invention, a machine for making rods of the cigarette industry includes at least two parts which are driven by separate motors, means for producing a pulsed electrical signal at a frequency proportional to the speed of the first motor, means for producing a pulsed electrical signal at a frequency proportional to the speed of the second motor, and a comparator device for comparing the two pulsed signals and for controlling the speed of the second motor to maintain a predetermined relationship between the two pulse frequencies.

An important possibility which this invention facilitates is the use of a separate motor to drive the filter attachment machine. This allows the filter attachment machine to be run on for a short period after the making machine has stopped producing rods. Thus the completed cigarette rods can all be joined to filters and waste is avoided.

A mechanical drive can be used as an alternative to the above-mentioned arrangement to allow the filter attachment machine to be driven independently of the cigarette making machine. Two separate motors may be fitted respectively to the making and filter attachment machines, with a dog clutch between them to ensure phase synchronisation where both are running. However, a preferred arrangement is described below with reference to FIG. 3 of the accompanying drawings, using a common motor for driving both machines.

Examples of machines according to this invention will now be described with reference to the accompanying drawings. In these drawings.

Figure 1:
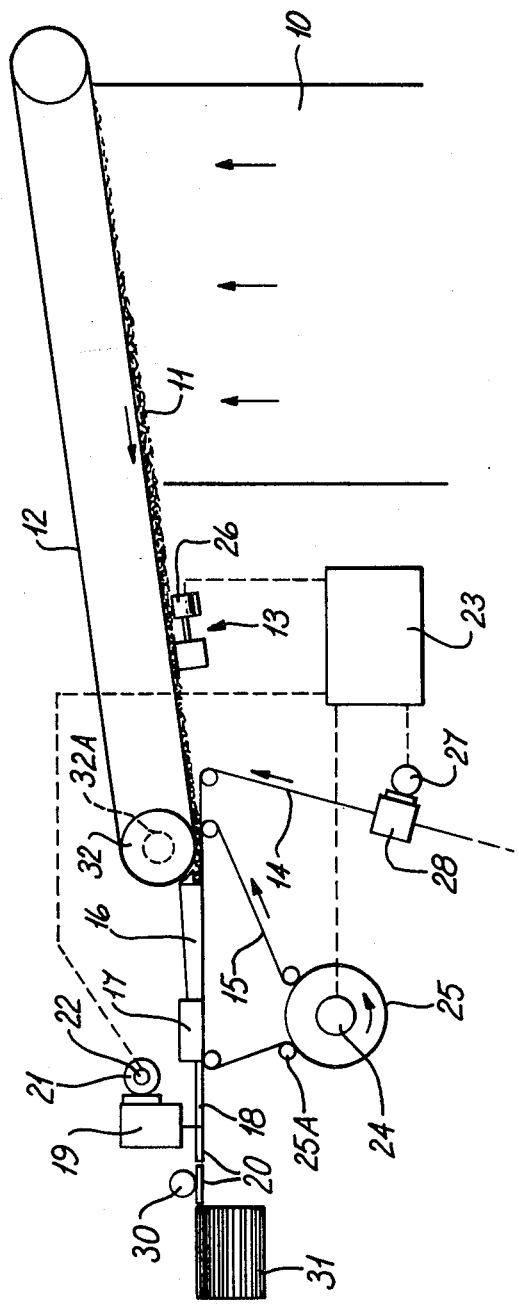
FIG. 1 is a schematic drawing showing a cigarette making machines having a number of synchronised motors.

An example of a cigarette machine according to this invention is shown in FIG. 1 which is a diagrammatic drawing. The machine is basically like a Molins Mark 9 cigarette making machine. Tobacco is showered up a chimney 10 with the aid of an upward air flow to form a cigarette filler stream 11 on a suction band 12. The filler stream is then trimmed by a trimming device 13 and is then deposited by the band 12 on a wrapper web 14 supported by a garniture tape 15. A tongue 16 compresses the filler stream to its final cross-section, and a folder 17 secures the web 14 around the compressed filler stream to form a continuous cigarette rod 18. A cut-off device 19 cuts the continuous rod at regular intervals to form individual rods 20 which are accelerated by a suction wheel 30 (e.g. like the wheel 3 described in out British patent specification No. 1,313,133) and then enter into the flutes of a fluted drum 31 forming part of a filter attachment machine which may, for example, be a Molins PA8 machine.

The general arrangement for forming the cigarette filler stream is in accordance with the invention described in British patent specification No. 916,141. The trimming device 13 is generally in accordance with the invention described in British patent specification No. 881,024 as modified in accordance with specification No. 1,314,825. The cut-off device 19 may be in accordance with British patent specification No. 1,238,458, i.e. may comprise a disc or cylinder with an inclined blade, the axis of rotation of the disc being inclined to the cigarette rod so that the blade is at right angles to the rod during cutting.

The cut-off device is driven directly by a motor 21. The drive may be direct in the sense that it comprises a straight coupling; alternatively, a slight step down or step up gear drive may be used if it is convenient to do so. The same motor may be arranged to drive a ledger for supporting the rod during cutting, e.g. a rotary ledger as described in British patent specification No. 1,238,458 or No. 1,332,689.

Mounted on or associated with the motor 21 there is a pulse generator 22 for indicating the speed and phase (rotational position) of the cut-off motor. The pulse generator may be an optical device or may include a magnetic pick-up; such devices are available as bought-out items. Alternatively, the pulse generator may monitor the speed and phase of the cut-off device itself.

A control console 25 receives signals from the pick-up device 22 and controls the speed and rotation of various independent motors so as to synchronise or "slave" those motors to the cut-off drive motor 21. "Synchronise" in this context does not mean that the motors all need to run at the same speed. On the contrary, the speed of each slaved motor relative to the speed of the cut-off motor 21 is preferably adjustable.

In particular, the control console 23 controls a motor 24 driving a drum 25 around which the garniture tape 15 passes and by which the tape is driven. Furthermore, as shown in the drawing, a motor 26 driving the trimming device 13 is controlled by the console 23, as is a motor 27 driving a printer 28. Finally, the drawing shows diagrammatically a motor 32a driving a pulley 32 around which the suction tape 12 passes, which motor may also be controlled by the console 23.

Other motors may also be driven in a synchronised fashion via the control console 23. For example, a motor slaved to the cut-off drive may be provided to drive the filter-attachment machine by which filters are attached to the cigarettes 20. This allows the filter attachment machine (which is commonly driven from the cigarette making machine) to be maintained in operation for a short time after the maker is stopped, so as to allow all the materials (filters, cigarettes and tipping paper) to be used up before the filter attachment machine is stopped; the run-down sequence for the filter attachment machine is preferably programmed so that this happens automatically. In the arrangement shown in the drawing, the accelerator wheel 30 or an equivalent device is perferably driven by the motor driving the drum 31 and the other parts of the filter attachment machine; the timing of that motor with respect to the motor 21 is then not very critical, an accuracy of up to about 10% being possibly acceptable.

The cut-off motor 21 may be in any convenient form, preferably with provision for speed control. However, each of the motors which is slaved to the motor 21 needs to be in a form which can be controlled with a certain degree of accuracy (not necessarily the same for each motor) both as to its speed and, in the case of at least the motors 26 and 27 and the filter attachment drive motor, also as to its phase. Motors are available for that purpose, for example, as described in patent specification Nos. 1,331,601, 1,375,824 and 1,382,807.

Figure 2:
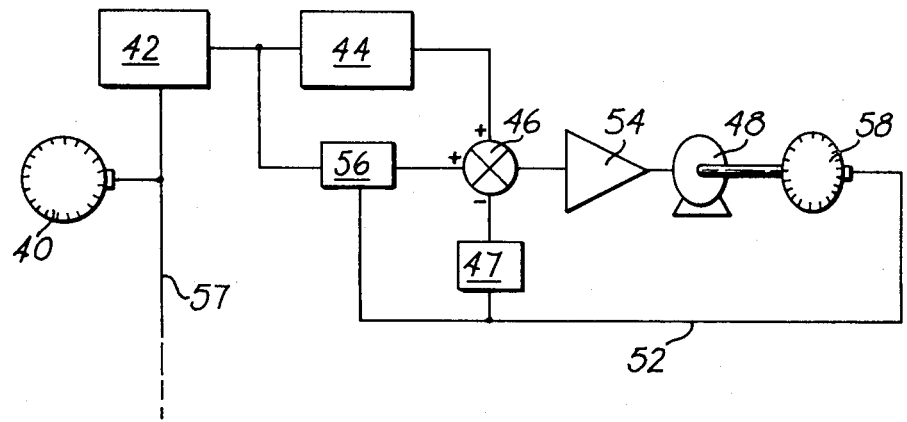
FIG. 2 shows a circuit whereby one slave motor can be synchronised to a master both as to speed and as to phase.

FIG. 2 is a block diagram showing how one of the slaved motors may be controlled in the system shown in FIG. 1.

A pulsed electrical signal at a frequency proportional to the speed of the cut-off is picked up from a rotating part 40 which may be part of the cut-off or of its drive motor. The pulses are fed to a device or circuit 42 (of known design) which produces an output in the form of pulses at a frequency bearing a predetermined ratio in relation to the frequency of the pulses fed into the device 42; the output frequency from the device 42 is preferably adjustable. The device 42 may be a rate multiplier, e.g. a BCD rate multiplier such as type CD 4527B made by RCA, or a binary rate multiplier such as the RCA type CD 4089B. Another possibility is that the device 42 may be a variable divider circuit, e.g. a COS/-MOS presettable Divide-by-N counter such as the CD 4018A type made by RCA, or a cascade of such devices. Alternatively a microprocessor or other form of computer may be programmed to provide an equivalent mode of operation.

The pulsed output from the device 42 is fed to a rate meter circuit 44 (of known design) which produces a D.C. output voltage proportional to the input pulse frequency. This output voltage is applied to an analogue comparator device 46.

The slaved motor 48 (which in this example is required to be synchronised as to speed and phase) drives a rotary part 58 serving as a pulse generator producing a pulsed output which is fed by line 52 to the comparator device 46 via a rate meter 47. The device 46 compares the voltages respectively from the two ratemeters and produces an output to a high-gain amplifier 54 responsive to the voltage difference or to a time integral of the difference. The output of amplifier 54 governs the speed at which the motor 48 is driven, e.g. by controlling the current in the armature or field windings if the motor 48 is a D.C. motor. Thus the motor 48 is driven at a speed bearing a fixed relationship with the speed of the cut-off.

The pulsed output from the device 42 is also fed to a phase comparator circuit 56 (of known design), which circuit also receives a pulsed input from the line 52. If the pulses received by the phase comparator are out of phase, the comparator 56 produces an output which is fed to the comparator 46 and tends to increase or decrease the speed of the motor 48 (whichever is necessary) until the pulses are synchronised as to their phase.

A line 57 transmits the pulsed signal from the rotary part 40 to additional circuits for controlling motors driving other parts of the machine.

The pulse frequency transmitted by line 52 may also be modified by means of a rate multiplier or other frequency-changing device such as any one of those described above with regard to the device 42. In that case the device 42 may be omitted; but it might be convenient nevertheless to keep it so as to obtain the greatest possible flexibility in regard to adjustment of the relative speeds of the respective parts of the machine.

In the simplest case, the parts 40 and 58 may be arranged to produce pulses at the same frequency when rotating at the desired relative speeds. For example, if the motors driving the parts 40 and 58 are required to rotate at speeds having a ratio of 2:1, the parts 40 and 58 may comprise optical gratings (with associated optical pick-offs), the part 58 having twice as many circumferentially spaced grating elements as there are on the part 40. If there is a need to alter the relative speeds, the part 40 or 58 may be replaced by a part having a different number of grating elements.

It will be understood that the voltage output of the rate meter 44 is proportional the required speed of the motor 48, while the voltage output of the rate meter 47 is proportional to the actual speed of the motor 48. If precise speed control is required then phase comparison and correction may be provided (e.g. as described above) even if phase correspondence between the parts of the machine driven by the two motors is not in itself necessary, for example in the case of the garniture tape. Phase correction eliminates the possibility of any slight drift in the speed relationship since such a drift would naturally also affect the phase relationship between the respective pulses. In the case of the garniture tape, pulses may be generated by a rotary part which is, for example, on or part of the drum 25 or on idler pulley 25A on the tension side of the drum; alternatively, the tape 15 itself may be marked at regular intervals, e.g. by an additional weft thread, and the marks can be sensed to produce pulses.

In the place of the rate meter 47 it is possible to provide the motor 48 with a tachometer for generating a voltage proportional to the speed of the motor 48 to be fed into the comparator device 46. This applies particularly if phase correction is not needed, for example in the case of the hopper of a cigarette making machine.

Where the load of the slaved motor 48 is relatively light, e.g. in the case of the motor 26 (FIG. 1) driving the trimmer, a stepping motor may be used.

Instead of one motor being the master to which all the others are "slaved", it is possible to have chain of command. For example, the motor 21 may be "slaved" to the motor 26 (which motor may also drive the band 12), and the motor driving the filter attachment machine may be "slaved" to the motor 21.

In the case of a filter making machine, there may be one motor (a master) driving the garniture tape and the moving parts (rollers etc.) of the equipment feeding the filter tow to the garniture, and the cut-off may be driven by a second motor "slaved" to the first motor.

Figure 3:
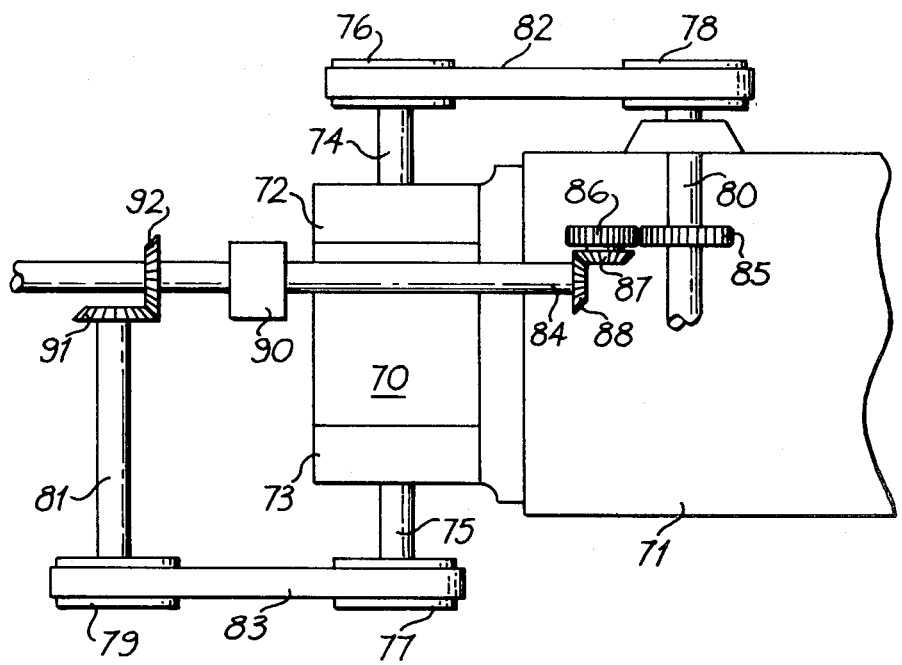
FIG. 3 shows a mechanical drive arrangement whereby a cigarette maker/filter attachment combination can be driven independently or together by a common motor.

FIG. 3 shows a mechanical connection whereby a filter attachment machine may be driven by the same motor as a cigarette making machine, with provision for continuing the drive to the filter attachment machine for a short period after the drive to the cigarette making machine has ceased.

A drive motor 70 is mounted on one end of the cigarette making machine 71. At opposite ends of the motor 70 there are two eddy current couplings 72 and 73 respectively having output shafts 74 and 75; these couplings may, for example, be Heenan couplings. These shafts carry pulleys 76 and 77 which drive pulleys 78 and 79 on further shafts 80 and 81 via belts 82 and 83.

The shaft 80 drives at least part of the cigarette making machine and also drives a further shaft 84 via spur gears 85 and 86 and bevel gears 87 and 88. A shaft 89, which is the drive shaft for the filter attachment machine, is capable of being driven by the shaft 84 via a unidirectional dog coupling 90 which couples the shafts 83 and 88 only when they are in one or more (e.g. four) predetermined positions with respect to one another. By this means, the phase of the shaft 89 is sufficiently predetermined with respect to the cigarette making machine, and this allows successive cigarette rods to be received in successive flutes of the fluted drum 31 shown in FIG. 1.

The dog coupling 90 may, for example, be a ball-drive coupling such as that made by GIB Precision Ltd.

The shaft 81 carries a bevel-gear 91 which meshes with a bevel-gear 92 on the shaft 89.

The drive ratio provided by the pulleys 77 and 79 and the belt 83 is such that, when the coupling 73 is engaged, it tends to drive the shaft 89 at a speed which is approximately 1% slower than the shaft 84.

The operation of the machine is as follows. When the cigarette-maker/filter attachment combination is started, both the couplings 72 and 73 are initially engaged. Therefore the shaft 89 driving the filter attachment machine rotates initially slightly more slowly than the shaft 84, which slowly catches up until the dogs of the clutch 90 engage so as to drive the shaft 89 in the desired phase relationship with the shaft 84 and at the same speed. By this means, the initial load in starting the filter arrangement machine does not normally have to be borne by the driving parts of the dog clutch 90 as they engage one another; instead, the dogs can engage more gently, i.e. with a 1% speed differential.

Shortly after the combination is switched on (allowing sufficient time for the dogs of the clutch 90 to engage), the current energising the coupling 73 is switched off. During continuing operation the shafts 81 and 75 merely idle.

When the cigarette making machine is required to stop, the coupling 72 is de-energized, and at the same time the coupling 73 is energised. This allows the filter attachment machine to continue to be driven (at approximately 1% below full speed) while the making machine slows down and eventually stops. The filter attachment machine may be programmed to run long enough to feed through it all the cigarettes which it had already received from the making machine when the making machine started its run down procedure. In other words, all the cigarettes received from the making machine are joined to filters (thus avoiding any waste of cigarettes), after which the coupling 73 is de-energised to stop the filter attachment machine.

It should be appreciated that a cigarette making machine normally does not make satisfactory cigarettes during the run down procedure. Therefore it is usual for the cigarette rod to be deflected from its normal path as soon as a stop signal for the machine is emitted to start the run down procedure. At that point in time, there are already a significant number of satisfactory cigarettes in the filter attachment machine, and the present invention enables those cigarettes to be joined to filters, thus avoiding any waste.

The filter attachment machine may be provided with a "slow" button which, when pressed, energizes the coupling 73 and causes the motor 70 to run slowly to allow the operation of the filter attachment machine to be checked in slow motion without driving the cigarette making machine.

For the purpose of phase synchronisation in FIG. 1 or FIG. 2, e.g. to ensure that the cut-off cuts the rod through the "dense end" portions, the pulse generator 40 (FIG. 2) may have one or more "master" marks to identify the precise rotational position of the cut-off. Instead of phase synchronisation being achieved by comparing the phase of two pulsed signals (which need to be at the same frequency for this purpose), it is possible to use a resolver (of known design) powered by an oscillator to control the "slave" motor in response to pulses received from the pulse generator 40, the resolver being driven directly or indirectly by the slave motor; in this case (and also in a pulse comparison system) the basic speed control may be achieved by means of a tachometer driven by or incorporated into the slave motor as described above.

The phase of the motor driving the trimmer in the case of a "dense end" system may be subject to control by a nucleonic scanning head, e.g. the Molins MAID, which detects the positions of the "dense end" portions in the continuous cigarette rod. By this means the positions of the "dense end" portions of the rod can be properly set in relation to the ends of the finished cigarettes in spite of process variations (e.g. due to speed changes of the machine as a whole) tending to displace the "dense ends".

In the case of the filter attachment machine, instead of its motor being synchronized with the cut-off motor, it may be sychronized with pulses emitted by a device detecting the gaps between successive rods as a result of acceleration by the accelerator wheel 30 (FIG. 1). The generation of such pulses is described in our British patent specification Nos. 1,066,056 and 1,320,151.

In the case of a filter making machine, the filter tow is commonly fed towards the garniture by a tow-opening system including a succession of pairs of driving rolls. Each pair of rolls may be driven by a separate motor synchronized electronically with a motor driving the garniture or cut-off, with automatic control of the relative speeds to control, for example, the amount by which the tow is stretched, thus controlling the pressure drop characteristics of the completed filters. Alternatively, a single motor may be used to drive the garniture tape and all the rolls, though in this case each pair of rolls is preferably driven via a variable-speed gearbox and is monitored as to its speed relative to the garniture or to another pair of rolls (e.g. by means of a pulse system as described above) and is controlled as to its speed in response to pressure drop measurement or some other process control measurement.

For the purpose of electronically controlling the slave motor with regard to phase in any of the above examples, the motion of the slave motor (or of a part driven thereby) may be translated into a change of phase between two alternating electrical signals, for example by means of a resolver, using the pulsed signal from the master motor as the reference which is converted directly or indirectly into a phase analogue of the required motion of the slave. By this means, the required motion of the slave is compared with the actual motion, and the control signal to the slave motor is varied accordingly.

We claim:

1. A method of making rods of the cigarette industry in which a continuous rod is formed with the aid of a garniture tape and is cut at regular intervals by a rod cutting device to produce separate rod portions, the improvements comprising driving the rod cutting device by means of a first motor which determines the speed of production of discreet rod portions by said rod cutting device, driving the garniture tape by means of a second motor, and automatically controlling the speed of said second motor in response to the rate at which separate rod portions are cut from the continuous rod by said rod cutting device.

2. A method according to claim 1, in which the speed of the first motor is sensed by generating a first pulsed electrical signal derived directly or indirectly from a rotary part on or associated with the first motor, and the speed of the second motor is sensed by generating a second pulsed electrical signal derived directly or indirectly from a rotary part on or associated with the second motor.

3. A method according to claim 2 in which each of the first and second pulsed signals is converted into a D.C. voltage proportional to the frequency, and in which the relative values of the two D.C. voltages are used to control the speed of the second motor so as to maintain the voltage relationship substantially constant.

4. A method according to claim 2 or claim 3 in which equal pulse frequencies are generated when the devices driven respectively by the two motors are operating at their desired speeds relative to one another, and in which control is exerted on the second motor to bring the pulses substantially into phase with one another.

5. A method according to claim 4 in which the equality of pulse frequencies is achieved by modifying the pulse frequency of the signal received from at least one of the rotary parts.

6. A machine for making rods of the cigarette industry comprising means for forming a continuous rod including a garniture tape, a rod cutting device for cutting the continuous rod at regular intervals to produce separate rod portions, a first motor for driving the rod cutting device, a second motor for driving the garniture tape, and control means for controlling the speed of the second motor in response to the rate at which rod portions are cut from the continuous rod by the rod cutting device.

7. A machine according to claim 6, including first means for producing a pulsed electrical signal at a frequency proportional to the speed of the first motor, including means said control means being responsive to the pulsed signal for controlling the second motor.

8. A machine according to claim 7 in which the control means comprises second means for producing a pulsed electrical signal at frequency proportional to the speed of the second motor, and a comparator means for comparing the two pulsed signals and for controlling the speed of the second motor to maintain a predetermined relationship between the two pulse frequencies.

9. A machine according to claim 8 in which said first and second means each include means for producing pulsed signals which are at the same frequency and in which said comparator means includes means for comparing the phases of the two signals and for controlling a power supply to the second motor to keep the pulsed signals substantially in phase with one another.

10. A machine according to claim 8 or claim 9 in which said control means includes means for processing at least one of the pulsed signals by an electronic device whereby the pulse frequency is modified.

11. A machine according to claim 10, in which the means for producing a pulsed signal from at least one of the motors includes means for altering the frequency of the pulses for a given speed of rotation of the associated motor, whereby the predetermined speed relationship of the two motors can be altered.

12. A machine according to claim 11 in which at least one of the pulsed signals is generated with the aid of a rotary part which is readily replaceable whereby a different rotary part can be substituted to produce pulses at a different frequency for a given speed of rotation of the associated motor.

13. A cigarette making machine according to claim 12 having a cut-off device driven by the first motor, the second motor being arranged to drive the filter attachment machine, garniture tape, hopper, trimmer or printer, or a combination of those devices.

14. A cigarette making machine according to claim 13 in which a number of independent motors are arranged to drive different parts of the machine and are synchronised to the rod-cutting device.

15. A machine according to claim 3, including second means for generating a pulsed electrical signal at a frequency proportional to the speed of the second motor, and means for converting the respective pulsed signals from said first and second means into D.C. voltages proportional to the respective frequencies of the pulsed signals, said control means including means for controlling the speed of the second motor to maintain a substantially-constant relationship between said D.C. voltages.

* * * * *